United States Patent Office 3,558,190
Patented Jan. 26, 1971

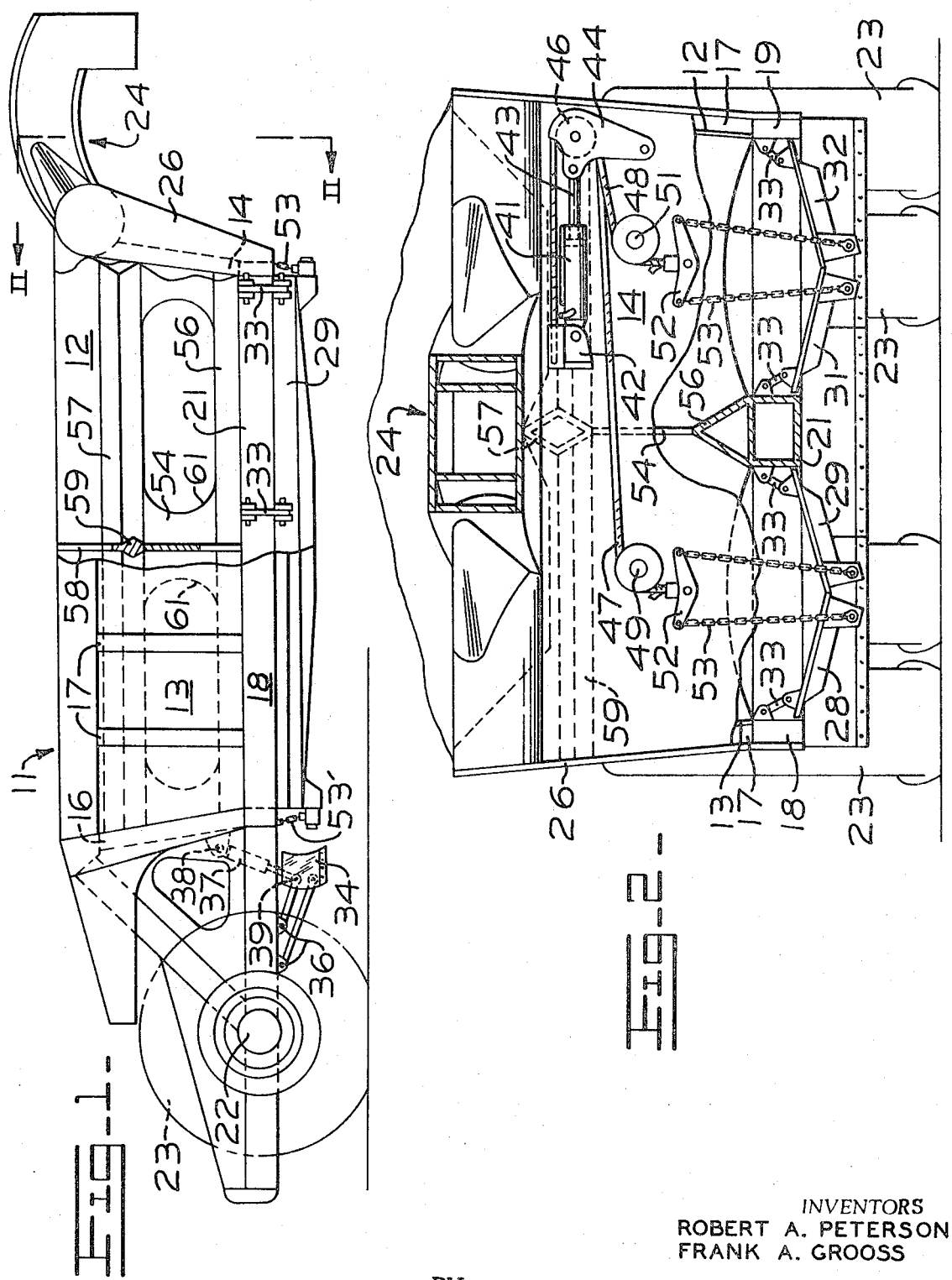

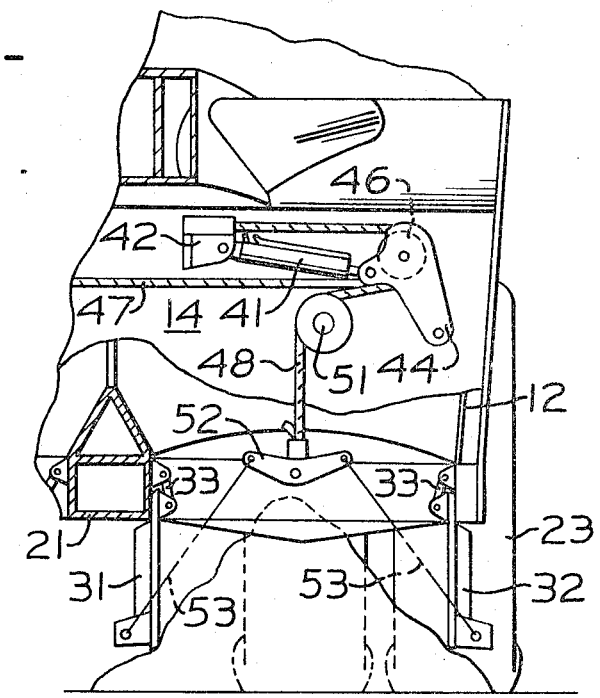
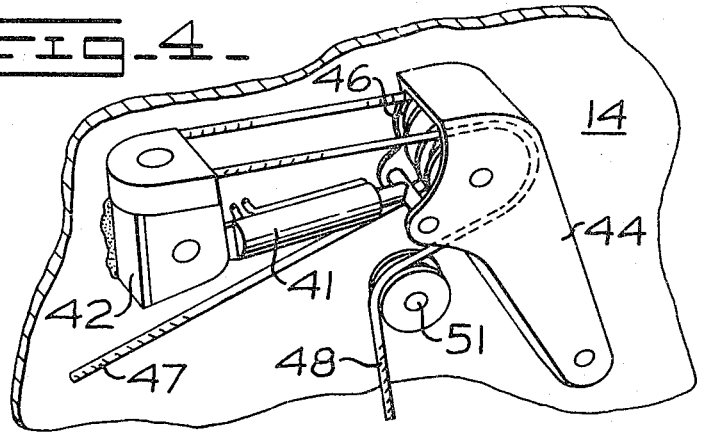

3,558,190
BOTTOM DUMP TRANSPORT VEHICLE
Robert A. Peterson, San Leandro, Calif., and Frank A. Grooss, Morton, Ill., assignors to Caterpillar Tractor Co., Peoria, Ill., a corporation of California
Filed Dec. 20, 1968, Ser. No. 785,597
Int. Cl. B60p 1/56
U.S. Cl. 298—33                               1 Claim

ABSTRACT OF THE DISCLOSURE

A large capacity, transport vehicle having reduced overall height and center of gravity with improved unloading characteristics includes a body having three reinforcing beams arranged longitudinally along its center and two sides. Two side-by-side pairs of oppositely hinged doors extend longitudinally through the body and are pivoted respectively to the center beam and one of the side beams. Means are included for opening and closing the two pairs of doors. The door arrangement effectively permits substantial reduction in the vehicle draft. The arrangement of the three beams provides strength in the body for supporting loads as great as 100 tons or more. This feature is exemplified in a preferred embodiment where the beams extend rearwardly of the body and are secured to an axle supporting the rear of the vehicle. In this preferred embodiment, the rear wheels may be arranged generally within the lateral dimension of the body.

---

The present invention relates to bottom dump transport vehicles of a type suitable for carrying large loads of as much as 100 tons or more. Bottom dump vehicles or wagons have been described in the prior art and used in earthmoving operation. However, the use of these vehicles in such operations has been limited because of inherent disadvantages in the prior art design which have become particularly obvious in situations involving off-highway travel. The prior art vehicles tend to be characterized by high sidewalls and considerable ground clearance for the dump doors. These characteristics detrimentally result in a high center of gravity for the vehicle which retards cycle speeds. The high sidewalls increase overall height of the vehicle so that large loaders and shovels are necessary for loading. These machines also dump material in large single windrows so that full time service of a bulldozer is normally required for levelling. The large single windrow is also a disadvantage since the rear wheels of the vehicles tend to ride on the sides of the windrows. This often results in considerable damage to the sidewalls of the tires on the rear wheels.

One vehicle design for overcoming some of the above disadvantages employs sliding doors at the bottom of the body through which to dump material. These designs have not been particularly effective because of the need for expensive heavy duty motors to operate the doors. These vehicles are also subject to rapid wear due to friction created by sliding interaction at the doors with the material contained in the vehicles.

It is accordingly an object of the present invention to provide a bottom dump transport vehicle having a substantially reduced overall height and center of gravity.

It is a further object to provide such a vehicle having a body which is sufficiently strong to support large capacities of as much as 100 tons and more.

These objects are at least partially accomplished through the use of two side-by-side pairs of hinged doors supported between three reinforcing beams which extend the length of the vehicle body. This design permits substantial reduction in vehicle draft. In addition, the reinforcing beams may be extended rearwardly to support the body on rearward wheels which may be disposed within the lateral dimension of the vehicle body. This feature of a relative narrow wheel tread is of particular importance because it minimizes problems of the vehicle being transported on railroad flatcars and also minimizes tire damage through inadvertent contact with obstructions. The lower center of gravity afforded by this vehicle is a principal design feature that allows such relatively narrow tread wheels to be employed successfully, because otherwise stability would be detrimentally affected.

Additional objects and advantages of the present invention are made apparent from the following description having reference to the accompanying drawings.

In the drawings:

FIG. 1 is a side view in elevation of the present transport vehicle with parts shown in section;

FIG. 2 is an end view of the vehicle taken along section line II—II of FIG. 1;

FIG. 3 is a fragmentary view similar to FIG. 2 but showing one pair of bottom dump doors for the vehicle in an open position for unloading; and FIG. 4 is a fragmentary view of a hydraulic motor arrangement employed for opening and closing the bottom dump doors.

The large capacity, transport vehicle illustrated in FIGS. 1 and 2 has a body 11 including sidewalls 12 and 13 and end walls 14 and 16 forming a hopper for receiving material to be transported by the vehicle. The walls are provided with reinforcing ribs as indicated at 17 on the sidewall 13. The base of the body 11 is generally formed by three reinforcing beams 18, 19, and 21 which extend longitudially through the body. The larger beam 21 is arranged along the center line of the vehicle body while the other two beams are disposed along the sides of the body. The three beams extend rearwardly from the body 11 toward an axle 22 to which they are secured to support the rearward end of the vehicle body on wheels 23 which are mounted upon the axle 22. With this arrangement, the rearward wheels are disposed within the lateral dimension of the body 11, as best seen in FIG. 2, to reduce the overall width of the vehicle and protect the wheels from damage while permitting a reduced center of gravity and overall height for the vehicle as discussed more fully below.

A gooseneck hitch 24 is disposed at the forward end of the vehicle for connection to a tractor or other suitable draft vehicle (not shown). The gooseneck 24 is connected to the beams 18, 19, and 21 by means of draft arms, one of which is indicated at 26. With this arrangement, very large loads in the body 11 are supported upon the three beams 18-21 which are directly connected to the rear wheels 23 and the forward hitch 24. The vehicle accordingly provides a very strong structure for carrying loads of as much as 100 tons or more.

The present invention also contemplates substantial reduction of the center of gravity and overall height of the vehicle to permit higher speed and more efficient operation during transport. To accomplish this purpose, two pairs of bottom dump doors 28, 29 and 31, 32 are arranged in side-by-side relation along the length of the vehicle body 11. Each pair of doors is respectively pivoted in opposing hinged relation to the center beam 21 and one of the side beams 18 and 19 by floating hinge links 33. As may be best seen in FIG. 3, this arrangement of the bottom dump doors permits a substantial reduction in the overall height and center of gravity of the vehicle while still providing adequate clearance of the vehicle body above the ground to permit proper opening of the doors. In addition, the side-by-side doors permit material to be spread more uniformly across the width of the vehicle during unloading. To accomplish still more uniform distribution of the unloaded material, a strike-off blade 34 is laterally arranged behind the bottom dump doors and is pivoted to the beams 18 and 19 as at 36. A hydraulic jack 37 pivoted to the body 11 at 38 and to the strike-off blade at 39 permits the blade 34 to be raised and lowered relative to the ground.

An actuated mechanism for opening and closing the doors 28, 29 and 31, 32 includes a hydraulic motor or jack 41 which is trunnion mounted at 42 to the vehicle body 11 and has an extendible rod 43. The jack 41 is horizontally mounted with its rod 43 being connected to a pivotal lever 44 which supports two sheaves 46. Cables 47 and 48 are secured at one end to the body 11 from where they are trained over the sheaves 46 and then over respective sheaves 49 and 51 which are rotatably mounted above the forward ends of the respective pairs of doors 28, 29 and 31, 32. The cables 47 and 48 are secured respectively to single trees 52 which are respectively connected to the paired doors 28, 29 and 31, 32 by chains 53. In this manner, retraction of the hydraulic motor, as best seen in FIG. 2, permits both pairs of doors to simultaneously open while extension of the motor 41 simultaneously closes both pairs of doors. A similar actuating mechanism is also arranged behind the rear wall 16 and is partially indicated in FIG. 1 by the chains 53' which are connected to the rearward end of the longitudinally extending doors. This arrangement of the door actuating mechanism permits the hydraulic jacks, sheaves, cables and chains to operate outside the abrasive environment within the end walls 14, 16 and sidewalls 12, 13. The trunnion mounting for the jacks 41 and the manner in which the lever 44 supports and guides the cables 47 and 48 about the sheaves 46 tends to reduce wear in those members and permit reliable operation of the doors by the hydraulic jacks. Conventional hydraulic circuitry (not shown) may be employed with the hydraulic jacks 41 so that the present door actuating mechanism accurately regulates the rate at which material is dumped from the vehicle. Construction and mounting of the hydraulic jack 41, the sheaves 46 and cables 47 and 48, is more clearly shown having reference to FIG. 4.

To further strengthen the body 11 and make it more effective for handling large loads, a longitudinal spreader plate 54 is vertically arranged between the end walls 14 and 16 above the center beam 21. The longitudinal spreader plate 54 is joined to an inverted V-shaped structure 56 above the beam 21 which tends to permit complete dumping of material from the vehicle body. An upper beam 57 extends longitudinally through the body 11 above the center beam 21 and is also secured to the longitudinal spreader plate 54 to strengthen the body 11 and support the plate 54. A lateral spreader plate 58 is vertically arranged between the sidewalls 12 and 13 generally at the longitudinal center of the body 11. The plate 58 also includes a reinforcing member 59. Both the longitudinal and lateral spreader plates 58 and 54 are formed with openings throughout their lengths, as indicated at 61 in the longitudinal plate 54, to allow substantial cross-flow and shifting of material within the body 11 during loading and assure relatively balanced distribution of the load.

What is claimed is:

1. A large capacity load transporting bottom dump vehicle comprising
   a body supported at its rear by wheels, the body having hitch means at its forward end and sidewalls and end walls forming a hopper region for receiving material to be transported, three longitudinally extending reinforcing beams being arranged generally in horizontally parallel relation along the bottom of the body, two of the beams being disposed on the sides of the body, the third beam being disposed along the center line thereof,
   two pairs of bottom dump doors extending longitudinally through the body, each pair of doors being pivotally supported in opposing relation by the center beam and one of the side beams,
   means for opening and closing the two pairs of doors,
   an upper beam extending longitudinally through the body above the center beam, and
   a longitudinal spreader plate vertically arranged between the end walls of the body above the center reinforcing beam, the longitudinal spreader plate being secured along its length to the upper beam, and a lateral spreader plate vertically arranged between the sidewalls of the body generally at the longitudinal center thereof, the spreader plates forming openings to permit cross flow and shifting of material during loading for more uniform load distribution.

References Cited

UNITED STATES PATENTS

| | | | |
|---|---|---|---|
| 820,240 | 5/1906 | Mulock | 105—248X |
| 923,253 | 6/1909 | Eccard | 298—33 |
| 1,310,916 | 7/1919 | Liddell | 298—33 |
| 1,418,402 | 6/1922 | Scott | 105—251 |
| 2,156,601 | 5/1939 | Mosling | 298—35X |
| 3,198,579 | 8/1965 | Adams | 298—35 |
| 3,254,920 | 6/1966 | Bowen | 298—35 |
| 3,455,253 | 7/1969 | Floehr | 105—251 |

RICHARD J. JOHNSON, Primary Examiner

U.S. Cl. X.R.

105—251